US006684228B1

(12) United States Patent
De Nooij et al.

(10) Patent No.: US 6,684,228 B1
(45) Date of Patent: Jan. 27, 2004

(54) STEERING PROCESS AND STEERING MODEL BUILDER

(76) Inventors: Thomas De Nooij, Poorstraat 67, NL-3572 HD, Utrecht (NL); Philip Jan Koenders, Hectorstraat 38$^{hs}$, NL-1076 PS, Amsterdam (NL)

(*) Notice: Subject to any disclaimer, the term of this patent is extended or adjusted under 35 U.S.C. 154(b) by 0 days.

(21) Appl. No.: 09/831,556

(22) PCT Filed: Oct. 21, 1999

(86) PCT No.: PCT/EP99/08140

§ 371 (c)(1),
(2), (4) Date: May 11, 2001

(87) PCT Pub. No.: WO00/28447

PCT Pub. Date: May 18, 2000

(30) Foreign Application Priority Data

Nov. 11, 1998 (WO) .............................. PCT/EP98/07236

(51) Int. Cl.$^7$ .......................... G06F 17/30; G06F 12/00; G06F 17/00
(52) U.S. Cl. .......................... 707/203; 707/1; 707/100; 706/8; 706/16; 706/22; 706/45; 717/100; 702/102; 702/186
(58) Field of Search .......................... 707/203, 1, 100; 705/2; 706/45, 8, 16, 22; 717/100; 702/102, 186

(56) References Cited

U.S. PATENT DOCUMENTS

| | | | |
|---|---|---|---|
| 4,631,664 A | * 12/1986 | Bachman | ..................... 364/200 |
| 4,815,029 A | * 3/1989 | Backer et al. | ............... 364/900 |
| 4,841,441 A | 6/1989 | Nixon et al. | |
| 4,894,771 A | * 1/1990 | Kunii et al. | ................. 364/200 |
| 4,956,773 A | * 9/1990 | Saito et al. | .................. 364/200 |
| 5,008,810 A | * 4/1991 | Kessel et al. | ................ 395/156 |
| 5,019,961 A | * 5/1991 | Addesso et al. | ............. 364/192 |
| 5,241,645 A | 8/1993 | Cimral et al. | |

OTHER PUBLICATIONS

"Information Development Process Management System," IBM Technical Disclosure Bulletin, vol. 36, No. 1, Jan. 1993, pp. 171–172.

* cited by examiner

Primary Examiner—Frantz Coby
(74) Attorney, Agent, or Firm—Young & Thompson

(57) ABSTRACT

An application development environment for developing end user applications for supporting management of operational environment. The environment consists of a number of subsystems. An organization modeler for defining the operational processes and the organizational units that are involved. A connection builder for defining connections to collect data from other systems. A view builder to define the views on the data. A distributor to create the end user application. A steering process modeler for defining a steering process by the steps of identifying a steering process, identifying at least one steering step for each steering process and linking the steering steps in order to build the steering process model. A model builder for defining steering models by the steps of identifying a steering model, defining input variables, defining output variables, defining the relation between the input and output variables.

6 Claims, 8 Drawing Sheets

STEERING PROCESS AND STEERING MODEL BUILDER

BACKGROUND OF THE INVENTION

Organizations operate a large amount of steering processes. The function of steering processes is to support the management of operational processes. To perform this function steering processes produce information. The information is used to support the decision making on operational processes. The information is based on implicit or explicit steering models which are developed by the organization in order to control the operational processes. Information systems are used in the steering processes to produce the information.

DESCRIPTION OF THE RELATED ART

At this point of time various technologies or combinations of technologies are used to produce information.
1. On Line Analytical Processing (OLAP) Software OLAP software is often used together with database technology. OLAP software is used to select (a part of) data collection. Furthermore the software is used to perform simple operations on the data display the results of the operations. OLAP software preprocesses and stores the processed data collection to ameliorate response time in case of data selection.
2. Relational on Line Analytical Processing (ROLAP) Software ROLAP is often used in combination with database technology as well. This type of software basically has the same functionality as OLAP. It is used to select large amounts of data, perform simple operations and display the results. In case of ROLAP no preprocessing takes place. A query is formulated in Structured Query Language (SQL) or a SQL related language. The query is executed on the database.
3. Functional Software Packages Functional software packages are used to run various large administrations such as financial administrations or employee/salary administrations. They offer reporting tools to define reports on the data which are available in the database.
4. Specialized Control Systems This type of software supports specific steering processes on a specific area like logistics or inventory control. Often they can only be used by specific organizations or branches like process industry or transport.
5. Spreadsheet Spreadsheet software is used to perform medium complex calculations. Spreadsheet software does not use database technology for data storage. Spreadsheet software offer various functions to display data.

SUMMARY OF THE INVENTION

The invention is a part of an application development environment. The development environment is intended to develop software applications which support the management of operational processes (see FIG. 1). The development environment consists of the following subsystems:

Organizations modeler
This module is used to define the operational processes and the organizational units that are involved.
Connection builder
The connection builder is used to define connections to collect data from other systems.
View builder
This module is used to define the views on the data.
Distributor
The distributor creates the end user application.
The last two modules of the development environment make up the invention:
Steering process modeler
Model builder
The invention is intended to define steering processes by naming the steering steps and store them in the database. Furthermore the invention is intended to construct and store steering models. Steering models can be constructed by configuring standard steering models. Finally the invention is intended to connect steering steps with steering models and store the connections in the database.

The invention is innovative because none of the described technologies offer ways:
- to construct steering models in a predefined way by using configurable standard models
- to define steering processes by naming the steps and link them to the steering models Because of this invention it is possible to develop applications that support steering processes much quicker and with less effort than nowadays.

DESCRIPTION OF THE PREFERRED EMBODIMENTS

The below detailed description of the invention describes the process of defining a steering model, a sub model and a steering process and the linkage of steering models to a steering step.

New Steering Model Definition

Figure 1:
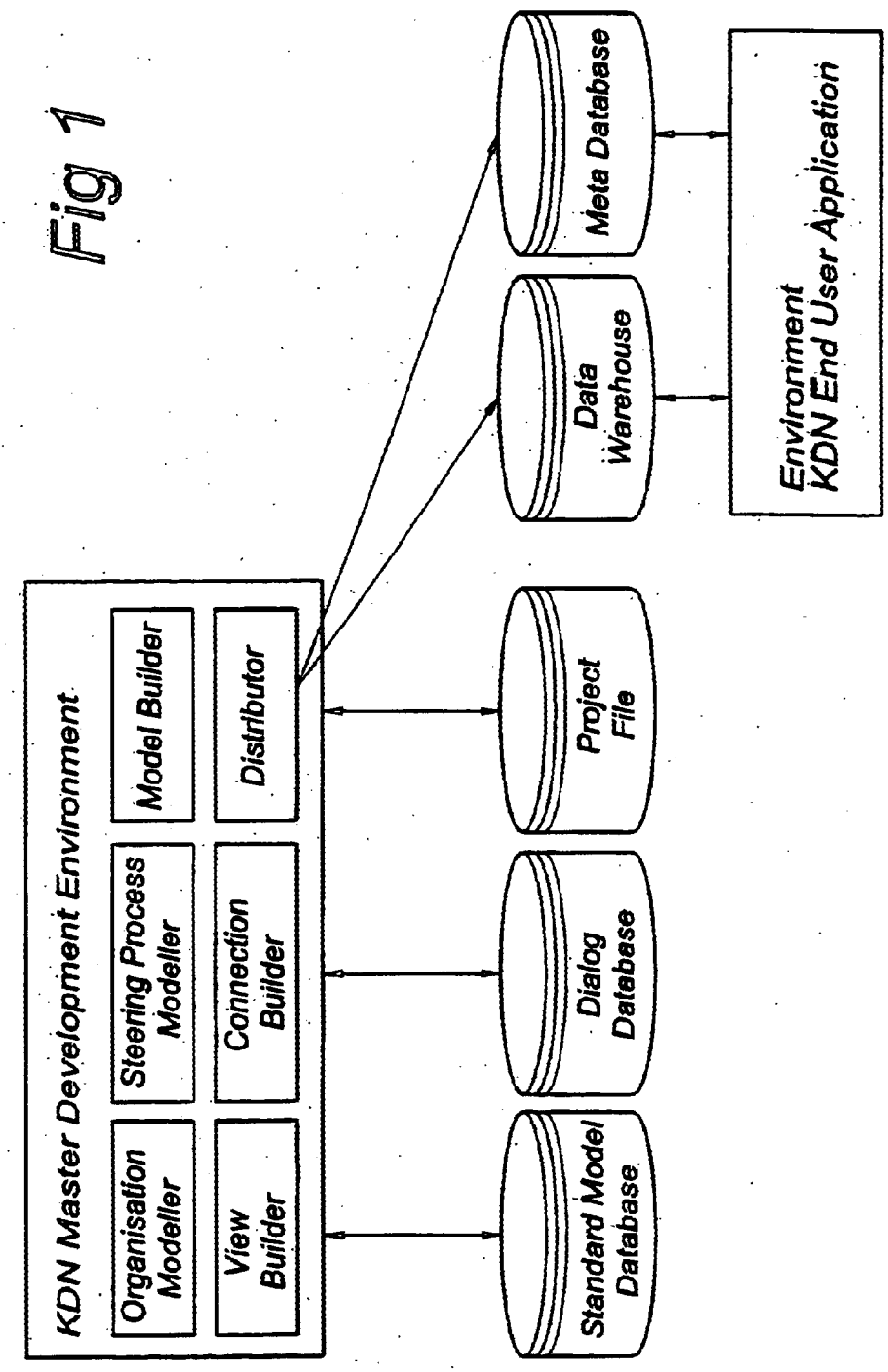
FIG. 1 shows software infrastructure of the present invention.
Figure 2:
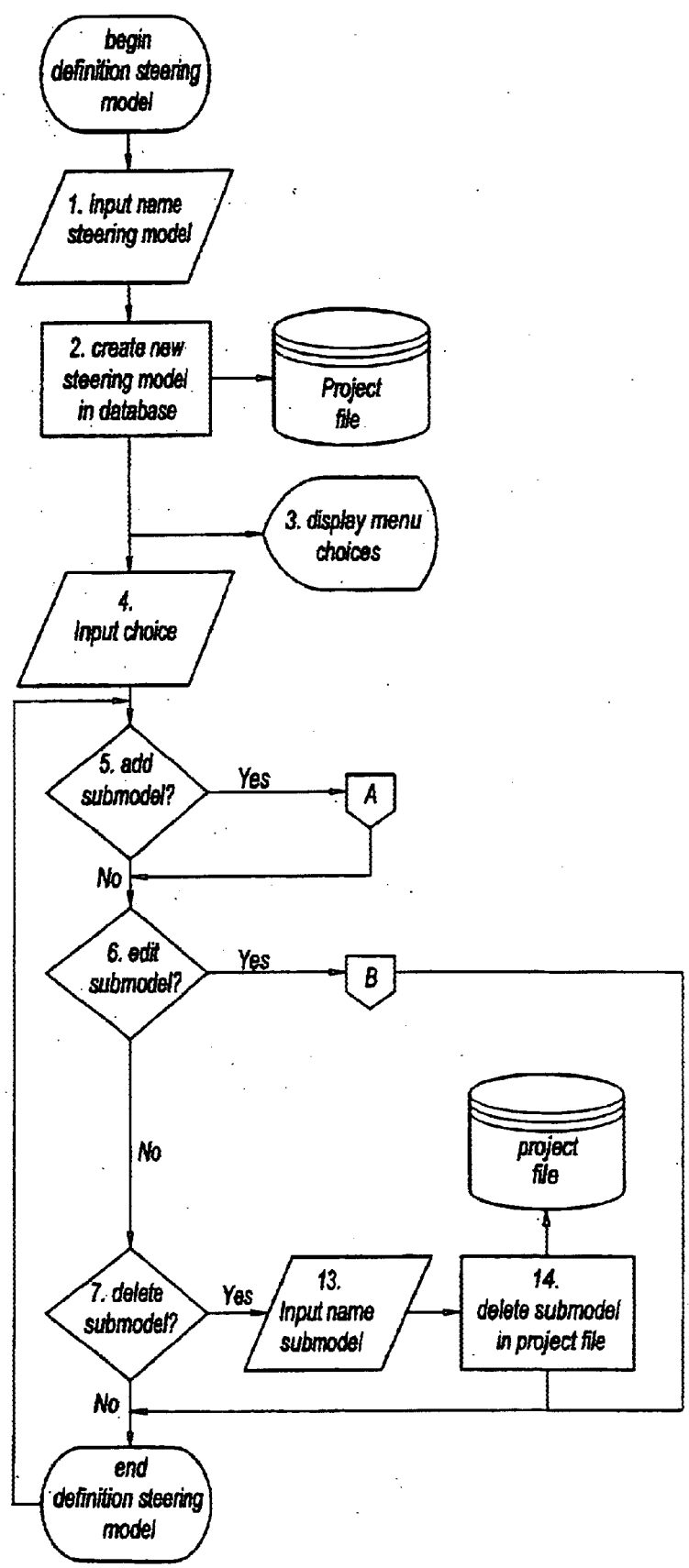
FIGS. 2–7 are flow diagrams.
Figure 3:
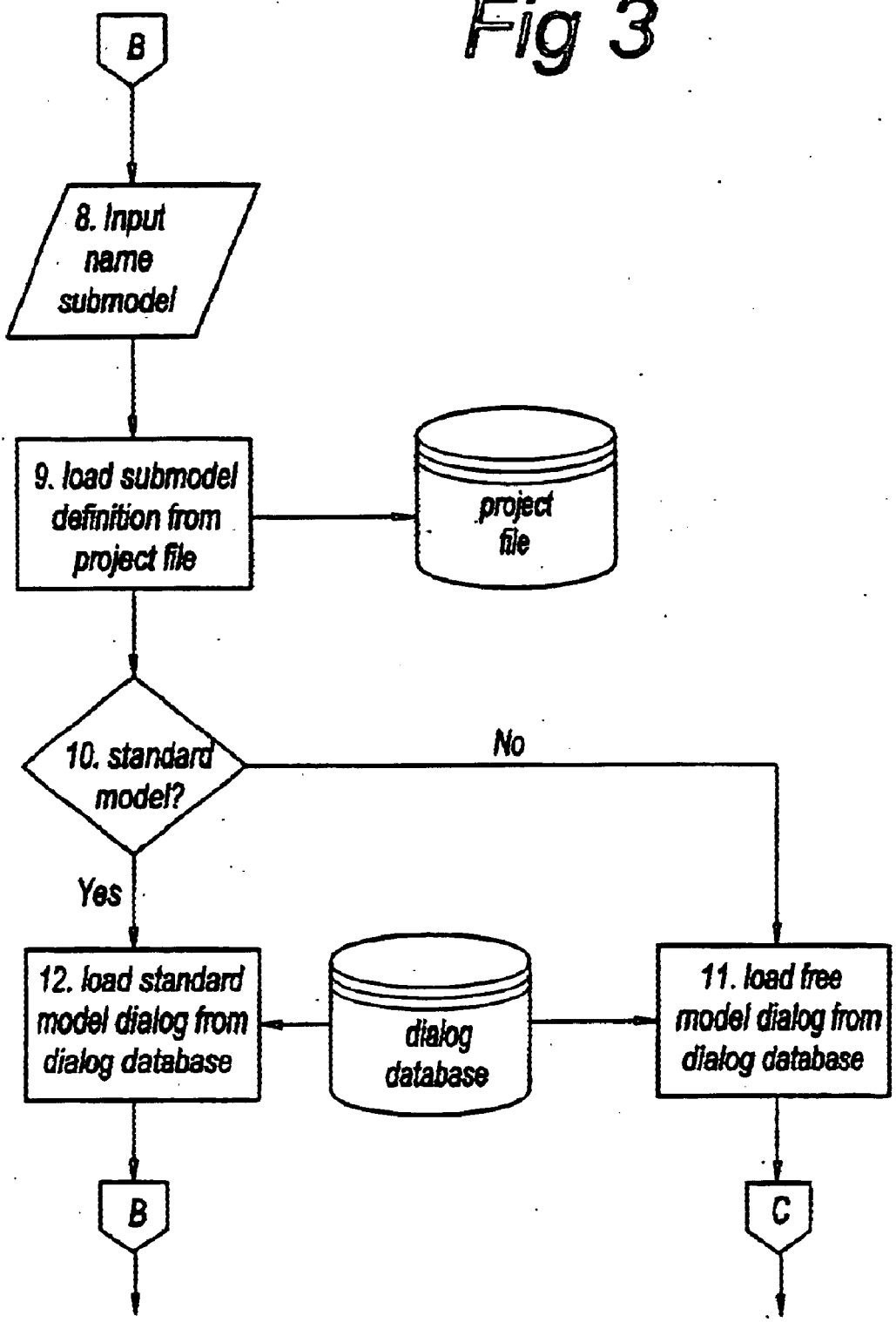

FIGS. 2 and 3 illustrate the process of defining a new steering model. The system asks for the name of the new steering model (1) and stores an empty steering model in the project file (2). Then the user is presented with three choices, namely defining a new sub model, editing an existing sub model or deleting an existing sub model (3).

Figure 4:
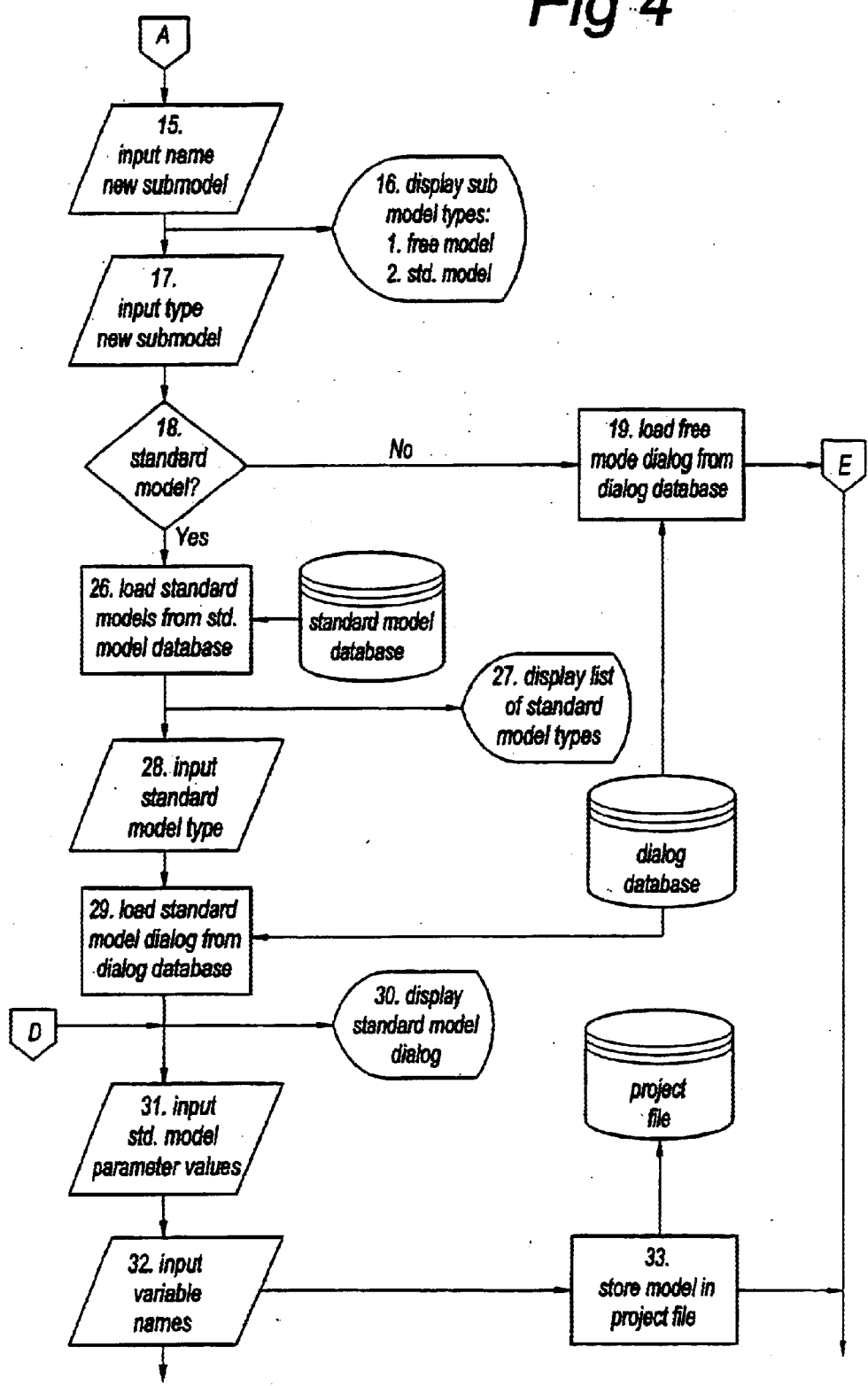
Figure 5:
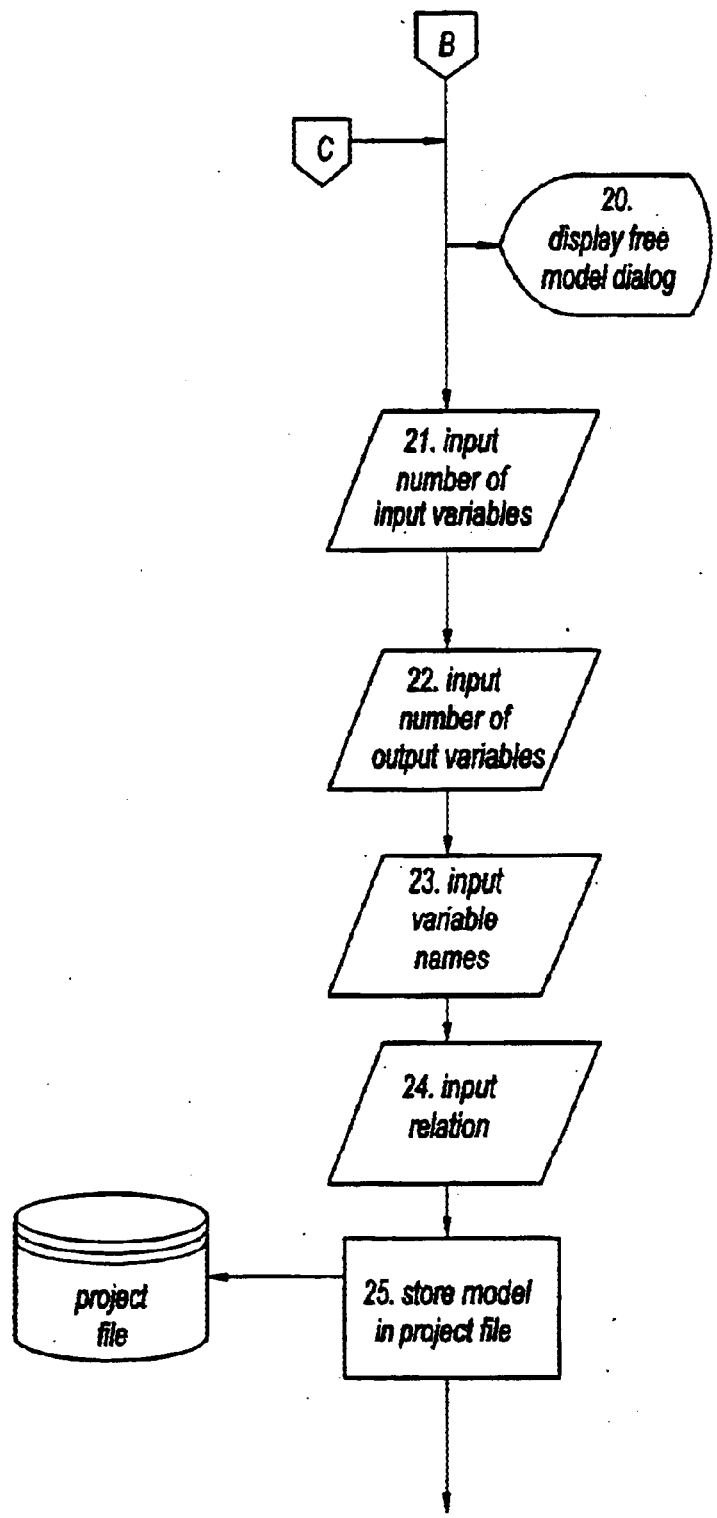

When the user chooses to add a new sub model (4, 5), the system asks for the name of the new sub model (FIGS. 4 and 5, step 15). The system asks the user for the type, 'free model' or 'standard model', of the new sub model (16, 17).

When the user chooses for a free model, the system loads the free model dialog from the dialog database and displays it (18, 19, 20). The system asks for the number of input and output variables of the new sub model (21, 22) and to name a variable for each input and output (23). Then the user has to enter the (logical) relation between the input and output variables (24). The sub model is stored in the project file (25) and the system returns to the steering model definition.

When the user chooses for a standard model (18), the system loads the available standard models from the standard model database (26) and displays a list of standard model types (27). The user chooses a standard model type and the system loads the accompanying dialog from the dialog database (28, 29). The dialog is displayed (30). The system asks the user to enter the values for the standard model parameters (31) and the variable name for each input and output (32). The sub model is stored in the project file (33) and the system returns to the steering model definition.

When the user chooses to edit an existing submodel (6), the system asks for the name of the sub model to be edited (8). The system loads the sub model definition from the project file (9). When the sub model is of type 'standard model' (10) the system loads the standard model dialog from the dialog database (11). When the type is 'free model', the system loads the free model dialog from the dialog database (12). Subsequently the flow continues at (B) and (C) for free models and standard models respectively.

When the user chooses to delete an existing submodel (7), the system asks for the name of the sub model to be deleted (13). The system deletes the sub model definition from the project file (14) and returns to the steering model definition.

New Steering Process Definition

Figure 6:
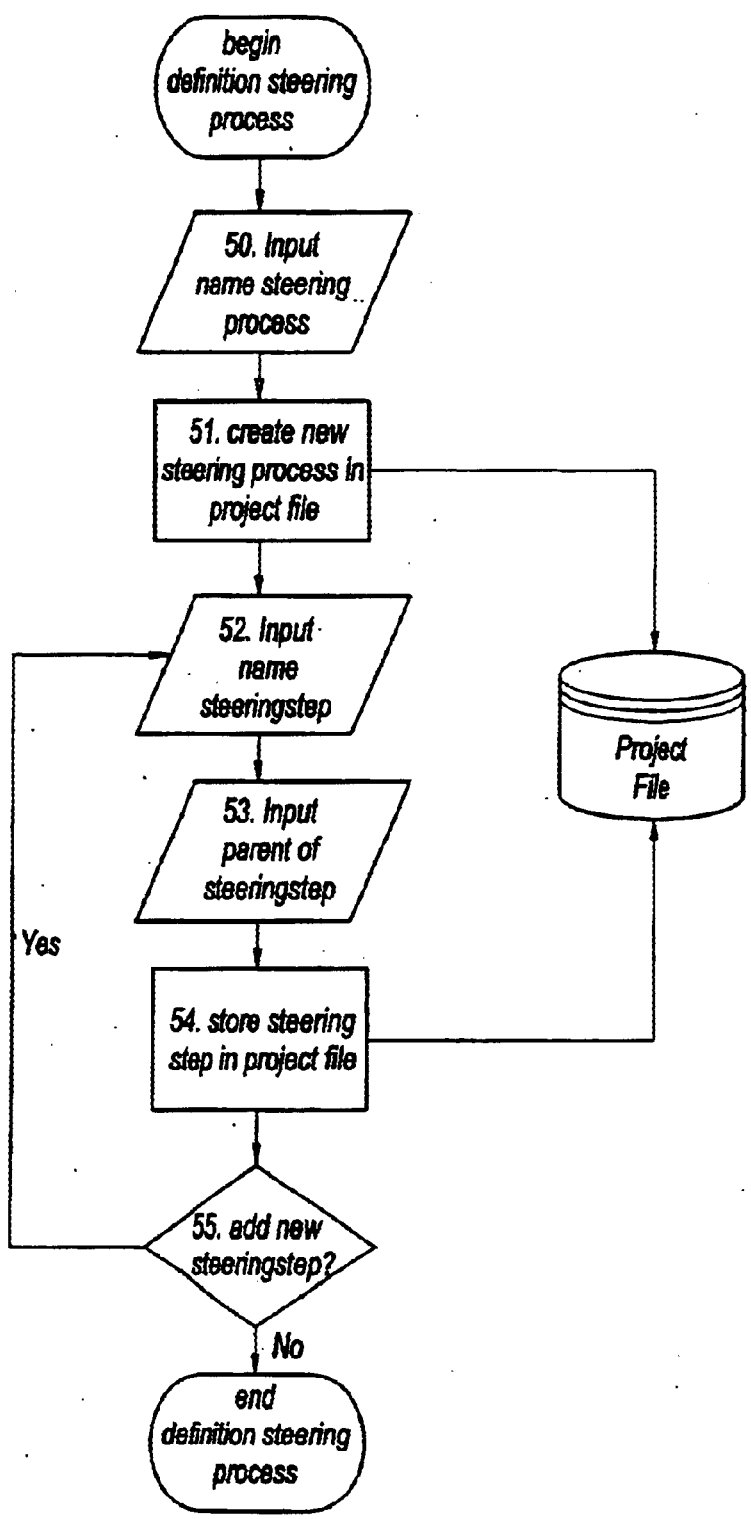

FIG. 6 illustrates the process of defining a new steering process and steering steps. The systems asks to enter a name for the new steering process (50) and creates a new steering process in the project file (51). Each steering process consists of one or more steering steps. These steering steps can be nested, so each steering step is either a root step or has a parent step. For each steering process, the system will define the steering steps that belong to the steering process, The system asks to enter a name for a steering step (52) and to enter the parent step for the steering step (53), Subsequently the system stores the steering step in the project file (54) and offers to add another steering step (55).

Connecting Steering Models to Steering Steps

Figure 7:
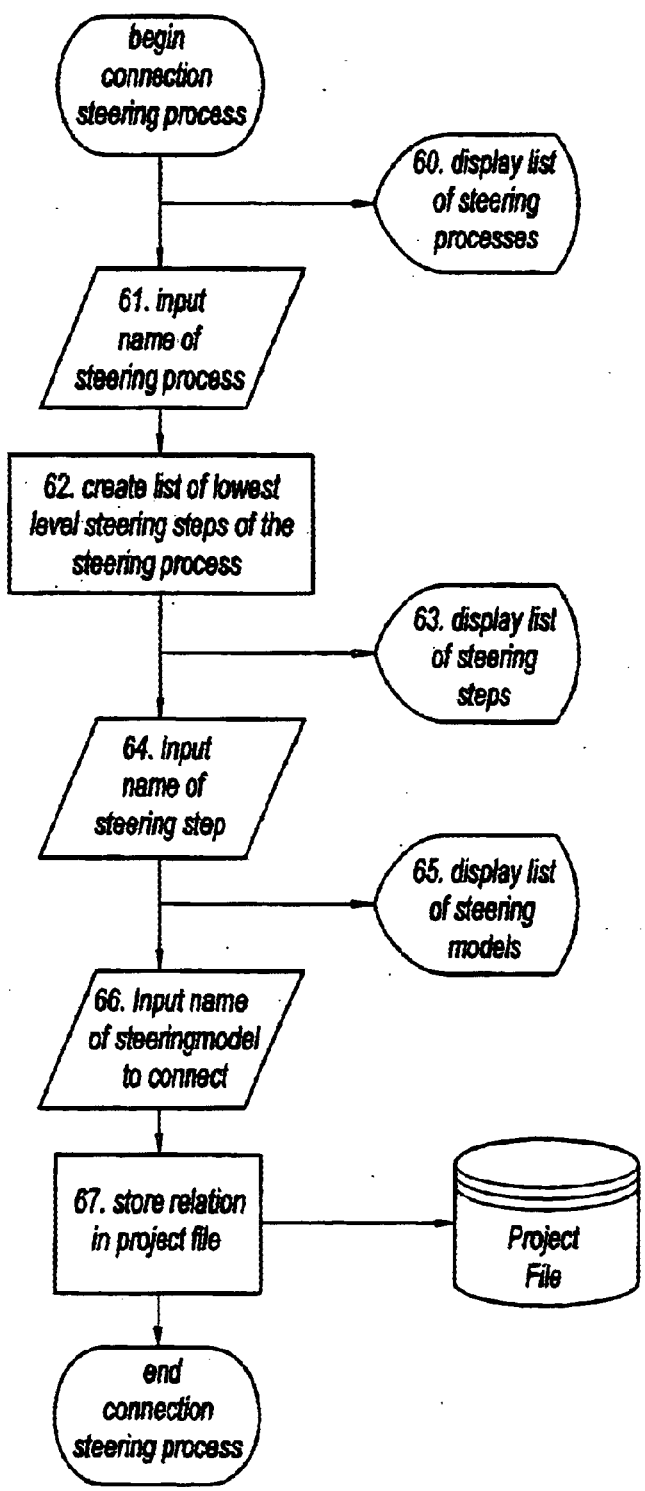

Each steering step of a steering process that has no sub steps (lowest level steering steps) has to be connected to a steering model. The system asks the name of a steering process (FIG. 7, step 60, 61). The system creates a List of lowest level steering steps (62) of this steering process and asks the user to enter a name of a steering step (63, 64). Next, the system displays a list of available steering models (65) and asks the user to choose one (66). The relation between the steering step and the steering model is stored in the project file (67).

Example of a Steering Process

The capacity planning process can be used to illustrate a steering process and steering steps. This process consist of the following steering steps:
1. Demand Forecast
   The expected demand is forecasted using specific forecasting techniques.
2. Generate Capacity Plan
   A feasible capacity plan is generated using a capacity planning algorithm.
3. Adapt Capacity Plan
   The generated capacity plan can be manually adapted.
4. Generate Roster
   Based on the capacity plan, a roster is generated to fill in the capacity need.

Example of a Steering Model

Figure 8:
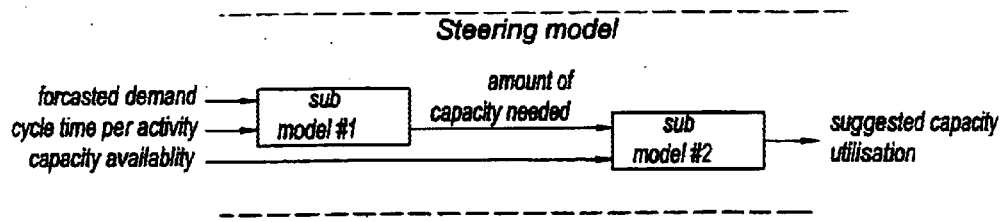
FIGS. 8–10 are model examples.
Figure 9:
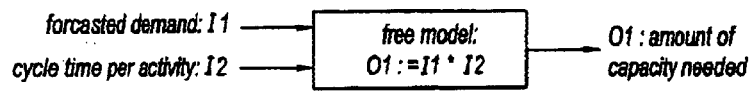

For the steering step "Generate capacity plan" the following steering model can be used (see FIG. 8). This steering model has three input variables and one output variable. The steering model is defined using two sub models. The first sub model is a free model, which calculates the amount of capacity needed based on the demand forecast and de cycle time per activity (see FIG. 9).

Figure 10:
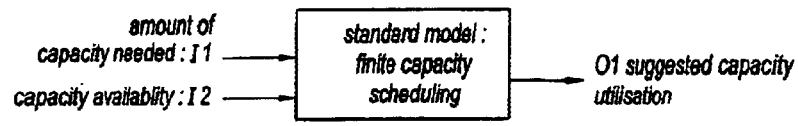

For the second sub model a standard model is used, namely "Finite Capacity Scheduling" (see FIG. 10). This standard model generates a suggested capacity utilisation, using a standard capacity scheduling algorithm.

What is claimed is:

1. Method for developing end user applications in an application development environment for supporting management of operational processes in an organization, in which the application development environment comprises:
   an organization modeler to define the operational processes and the organizational units involved;
   a connection modeler to define connections with the operational processes for collection of data;
   a view builder to define views of the data;
   a distributor for creating an end user application, wherein, the application development environment further comprises
   a model builder for defining steering models by the steps of:
      identifying a steering model,
      defining input variables,
      defining output variables,
      defining the relation between the input and output variables; and
   a steering process modeler for defining a steering process by the steps of
      identifying a steering process;
      identifying at least one steering step for each steering process;
      linking the steering steps in order to build the steering process model;
   and the method further comprises for each steering process the steps of
      displaying a list of lowest level steering steps associated with the steering process;
      after selection of one steering step, displaying a list of available steering models for selection;
      storing the relation between the selected steering step and the selected steering model; and
      linking the input/output variables associated with the selected steering model to the data.

2. Method according to claim 1, wherein the model builder performs the steps of storing the models in a standard model database, reading a model from the database, or modifying the identification, input/output variables or the relation between input/output variables.

3. Method according to claim 1, wherein the model builder further comprises the step of defining the number of and identifying the input and output variables.

4. Method according to claim 1, wherein the steering steps comprise lower level steering steps, and the steering process builder comprises the further steps of linking the lower level steering steps.

5. Apparatus arranged for carrying out the method according to claim 1.

6. Data carrier loaded with software which, after being loaded into a computer, provides the computer with the ability to carry out the method according to claim 1.

* * * * *